(No Model.)
H. ROREBECK.
WHIFFLETREE.
No. 295,811. Patented Mar. 25, 1884.
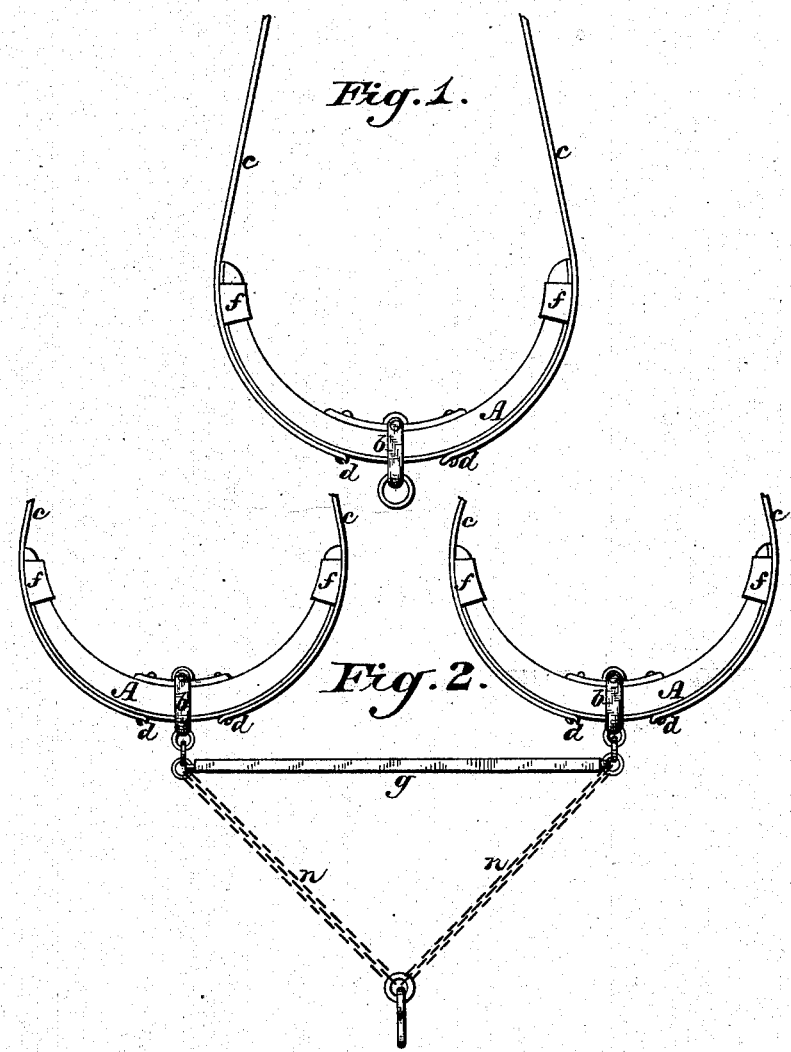
Witnesses.
E. M. Gallaher
K. F. Steele
Inventor.
Henry Rorebeck,
Attorney.

UNITED STATES PATENT OFFICE.

HENRY ROREBECK, OF PARMA, NEW YORK.

WHIFFLETREE.

SPECIFICATION forming part of Letters Patent No. 295,811, dated March 25, 1884.

Application filed June 2, 1883. (No model.)

*To all whom it may concern:*

Be it known that I, HENRY ROREBECK, a citizen of the United States, residing at Parma, in the county of Monroe and State of New York, have invented certain new and useful Improvements in Whiffletrees; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention is an improved whiffletree, and embraces the following peculiar features: a whiffletree in the form of a semicircle and having the traces or tugs extended and embracing its semi-periphery; also, said traces secured in position by box-loops passed over the whiffletree ends, and by double hooks fastening the trace ends behind the swing-clevis; and, lastly, a pair of said whiffletrees having a forked swing-chain with a spreader, instead of the usual evener or double-tree, all of which is hereinafter more fully described, and illustrated by the accompanying drawings, in which the same letters designate identical parts of my device in the different figures, respectively.

Figure 1 illustrates a plan view of my device, showing the box-loop and the trace end attachments to the semicircular whiffletree. Fig. 2 illustrates a pair of said whiffletrees, showing the same furnished with a forked swing-chain and spreader.

The letter A represents the whiffletree, which is made of suitable material, and either wrought or bent into a semicircular form, as shown, and furnished with the usual swing-clevis, *b*, and band-irons.

The tug straps or traces *c* are extended so as to embrace the periphery of the semicircle of the whiffletree, and are fastened behind by a pair of hooks, *d*, which are the rear extensions of the bolts of the clevis-brace, or the brace-plate itself curved outwardly at the ends into said hooks. Said traces are also further secured by the box-loops *f*, also of leather, which are made to fit over the whiffletree ends, as shown.

It will be readily seen that the peculiar form of my whiffletree, together with the novel way of placing and attaching the traces, makes plowing in orchards and nurseries and cultivating rows of high-growing plants much safer and quicker work than with the old-fashioned whiffletree, catching, entangling, chafing, barking, or breaking everything in its way.

In using my device, especially if the swing-chain is of suitable length, all such aforesaid otherwise entangling obstructions readily and gradually glide along the traces and past the whiffletree without stopping the work, damaging young trees or plants, or fretting plowman and team. Again, when a pair of whiffletrees is used, the same beneficial results are obtained, for, instead of the heavy, clumsy, and damaging single bar or evener, I substitute a light rod as a suitable spreader, *g*, which separates the connecting ends of the swing-chain *n*, thereby not only preventing any interference of the whiffletrees with each other, but allowing the whole device to readily swing aside and glide past any obstruction without delay, damage, or derangement of the direct course of the plow.

Besides the above-named qualities it should be added that the semicircular curvature of my whiffletree makes it very light and strong in proportion to its length, and, while it suitably encircles the hind quarters of the draft-animal, it causes the outer ends to gradually bear off all wayside obstructions along the lines of the tugs and round said curves, and serves to keep said tugs from bearing or flying back suddenly against the hind legs of the animal, thereby preventing hard knocks to wayside growth and the animal from startling and fretting; also, the box-loops *f*, being a part of the tugs, as they are slipped over and along the ends of the curved tree until the trace-eyes engage the hooks *d*, form a very simple, yet effective and secure, trace-attaching device. Therefore, Having described my invention, what I claim as new, and desire to secure by Letters Patent, is—

The wooden semicircular whiffletree A, furnished with the swing-clevis b and the trace-hooks d, near the center of the periphery of the same, to act in combination with the embracing-tugs c, each provided with the box-loop f, substantially as and for the purposes herein specified.

In testimony whereof I affix my signature in presence of two witnesses.

HENRY ROREBECK.

Witnesses:
GOWEN LOWERY,
LEWIS H. ROREBECK.